Feb. 11, 1941.  W. L. CHESTERMAN  2,231,252
TOOL HOLDER
Filed March 27, 1939
FIG_1_
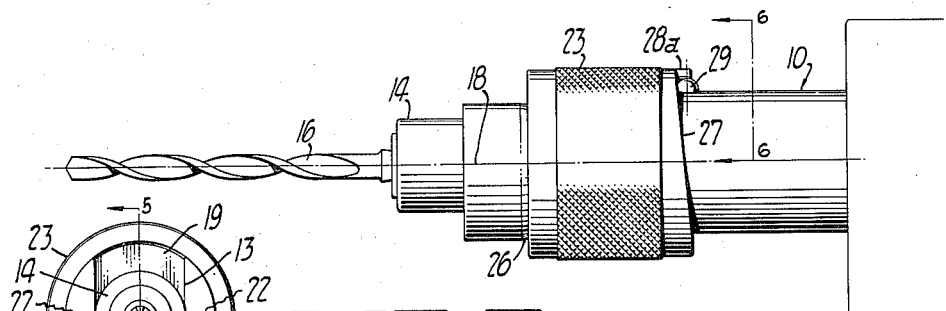
FIG_2_
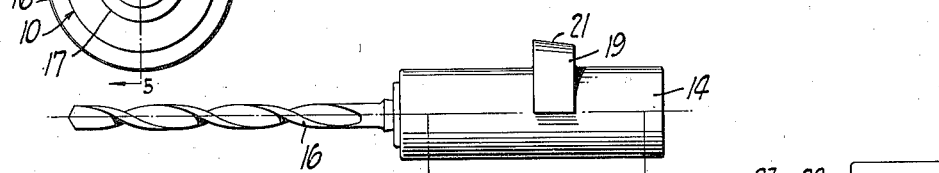
FIG_3_
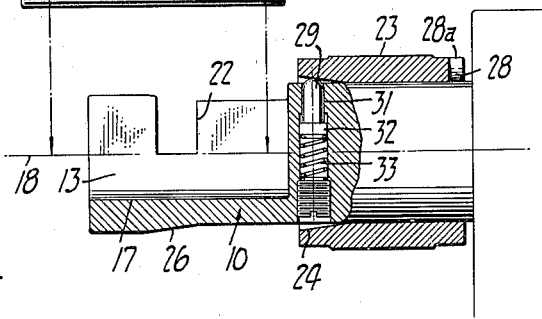
FIG_4_
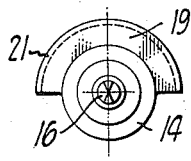
FIG_5_
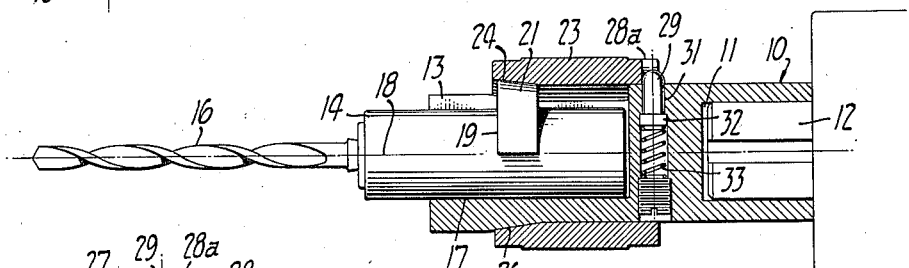
FIG_6_
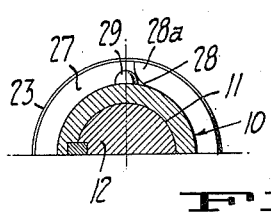
INVENTOR.
Walter L. Chesterman
BY
ATTORNEY

UNITED STATES PATENT OFFICE 2,231,252

TOOL HOLDER

Walter L. Chesterman, Berkeley, Calif.

Application March 27, 1939, Serial No. 264,384

5 Claims. (Cl. 279—9)

This invention relates generally to devices for the attachment of various tools to supporting means or appliances. It is suitable for use with a variety of machines, such as lathes, drill presses or milling machines.

It is an object of the present invention to provide an improved tool holder which will form a firm mounting for various tools, whereby the tool is accurately positioned and readily removed or applied to the mounting.

It is a further object of the invention to provide a tool holder which will enable application or removal of a tool by movement laterally of the holder, instead of movements in a longitudinal direction into or out of a socket.

Another object of the invention is to provide an improved type of locking means for a tool holder, thereby facilitating locking and release operations.

Additional objects of the invention will appear from the following description in which the preferred embodiment of the invention has been set forth in detail in conjunction with the accompanying drawing.

Referring to the drawing:

Fig. 1 is a side elevational view, illustrating a tool holder incorporating the present invention.

Fig. 2 is an end view of the device as shown in Fig. 1, looking from left to right.

Fig. 3 is an exploded view in side elevation, certain parts being in cross-section.

Fig. 4 is an end view of the members shown uppermost in Fig. 3.

Fig. 5 is a cross-sectional view taken along the line 5—5 of Fig. 2.

Fig. 6 is a cross-sectional detail taken along the line 6—6 of Fig. 1.

The tool holder illustrated in the drawing consists of a body 10 adjustably carried by some convenient supporting means or appliance. In this instance one end of the body is provided with a bore or socket 11 for attachment to the tail stock 12 of a metal working lathe. The body 10 is provided with a recess 13 adapted to receive the tool carrying member 14. Member 14 is elongated in form, and preferably circular in cross-sectional contour. In the embodiment illustrated, its one end is provided with a socket to receive the shank of a metal drill 16. It will be apparent that member 14 can be adapted for carrying other types of tools, or if desired it can be made a part of a tool shank or stem.

Recess 13 is preferably in the form of a slot opening through one side of the body. The width of this slot is slightly greater than the diameter of member 14, and the lower curved surface 17 conforms substantially to the surface of a cylinder, the axis of which coincides with the axis of the member 14, when this member is seated within the body. It is desirable that body 10 be circular in cross-sectional contour except for the interruption afforded by slot 13. Also in order to facilitate alignment of a tool on many types of machine, the longitudinal axis 18 of the body is made to be coincident with the axis about which surface 17 is curved. Therefore when the member 14 is seated within the slot or recess 13, its axis is coincident with the axis of the body 10.

As a part of the means for firmly locking member 14 within the body 10, this member carries a cam element 19 disposed intermediate the ends of member 14. This cam element is segmental in form as illustrated in Fig. 4, and its outer surface 21 is bevelled to conform substantially to the surface of a cone. The body 10 is provided with slots 22, which accommodate diametrically opposite end portions of the cam element 19. Thus when member 14 is seated within recess 13, an interlock is established between portions of the cam element 19 and the body, which serves to prevent movement of the member 14 in a longitudinal direction, and also serves to prevent rotation relative to the body.

The cam element 19 is releasably engaged by the locking sleeve 23. This sleeve is slidably and rotatably carried by the body 10, and its one end has an inner surface 24 conforming substantially to the surface of a cone.

The body 10 in the region of the slots 22 is provided with a peripheral surface 26 which likewise conforms to the surface of a cone, and which when the member 14 is seated in recess 13, forms a continuation of the peripheral surface 21. When sleeve 23 is pushed to the left as illustrated in Fig. 5, its surface 24 engaged both the surfaces 21 and 26, thereby forcing cam element 19 inwardly, and firmly retaining the member 14 within the body.

In order to firmly lock the sleeve 23 in engagement with cam element 19, I make use of camming means associated with the other end of sleeve 23. Thus this end of the sleeve is provided with two cam surfaces 27 and 28. Both of these surfaces cooperate with a pin 29, which is slidably carried within an opening 31 formed in the body. The inner end of the pin 29 has an enlarged head 32, to limit its outward movement, and a compression spring 33 serves to urge the pin outwardly. The outer end of the pin is rounded in the manner illustrated.

The pin 29 together with the cam surfaces 27 and 28, operates as follows:—When the sleeve 23 is slid longitudinally over the body to substantially locking position illustrated in Fig. 5, pin 29 is projected by spring 33, and is in a position in proximity with the cam surface 27. Now by turning sleeve 23 in a clockwise direction, cam surface 27 is brought into engagement with one side of pin 29, with the result that the sleeve is forced to the left (as viewed in Fig. 5) against the cam element 19. To release sleeve 23 whereby it can be slid back to the out-of-the-way position shown in Fig. 3, one turns the sleeve 23 in a counterclockwise direction to bring the cam surface 28 into engagement with the pin 29. Such engagement with continued rotation of the sleeve 23 causes pin 29 to be retracted, with the result that sleeve 23 can now be slid back to the position shown in Fig. 3. It will be noted from an inspection of Figs. 1, 3, 5 and 6 that cam surface 28 is actually formed on a shoulder 28a, which in turn is formed by cutting away of the end of the sleeve, to afford the cam surface 27. Cam surface 27 conforms substantially to a portion of a helicoid.

Operation of the device as a whole will be apparent from the above description. One can quickly grip or release the member 14, by manipulation of sleeve 23 in the manner described. Movement of this sleeve to released position as illustrated in Fig. 3 permits removal of member 14 with its associated tool 16, by movement of this member in a direction lateral of its axis. This is a distinct advantage in many types of machines or appliances where the invention may be employed. For example where the holder is being used upon a lathe tail stock, a metal drill can be removed for sharpening or replacement, without changing the adjustment of the tail stock. In holders of the type where the tool is carried within a socket, and where the tool must be moved longitudinally before releasing it from the socket, it is generally necessary to change the adjustment of the machine, each time the tool is removed and applied. This not only requires considerable time, but in addition it may detrimentally affect the accuracy of machining operations.

In addition to the foregoing features of the device, it affords a high degree of accuracy in the mounting of various tools, and the tool is held firmly during machining operations.

I claim:

1. In a tool holder, a body adapted to be retained by supporting means, an elongated member adapted to cooperate with said body, the body being provided with a recess opening through one side of the body into which said member may be seated, a cam element carried by said member intermediate its ends, and a locking member carried by the body and adapted to releasably engage said cam element, said cam element having interlocking engagement with said body in addition to engagement of said member with the body.

2. In a tool holder, a body adapted to be retained by supporting means, an elongated member adapted to cooperate with the body, the body being provided with a recess opening through one side of the same into which said elongated member can be seated, a cam element secured to said member at a point intermediate the ends of the same, said cam element extending laterally from said member, said body being provided with additional recesses adapted to receive portions of said cam element when the member is seated within the recess, and locking means carried by the body and adapted to releasably engage said cam element.

3. In a tool holder, a body adapted to be retained by supporting means and being substantially circular in transverse cross-sectional contour, a substantially cylindrical shaped member having a length many times its diameter, the body being provided with a recess opening laterally through one side of the body and in which the cylindrical member can be seated, the inner surface of the recess conforming to the surface of a cylinder having a diameter only slightly greater than the diameter of the cylindrical member, a cam member secured to the cylindrical member intermediate its ends and extending laterally from the same, the periphery of said cam element being substantially semi-circular in cross-sectional contour, the body being provided with slots to accommodate portions of said cam element, and a collar slidably rotatably carried by the body, a portion of said collar being adapted to engage the outer periphery of said cam element to lock said cylindrical member within said recess.

4. In a tool holder, a body adapted to be carried by supporting means, at least a portion of said body being substantially circular in cross-sectional contour, an elongated member adapted to cooperate with the body, the body being provided with a recess in which said member may be seated, a cam element carried by said member, a sleeve rotatably and slidably carried by said body, one end portion of said sleeve being adapted to engage said cam element to lock said member within the recess, upon forcing the annular member in one direction longitudinally of its axis, a surface formed on the other end of the sleeve, a pin retractably carried by the body and adapted to engage said cam surface whereby upon rotation of said annular member in one direction about the body, said sleeve is forced in tight engagement with the first-named cam element, and means operable upon rotation of said annular member in an opposite direction to retract said pin thereby permitting sliding movement of the annular member over the body.

5. In a tool holder, a body adapted to be retained by supporting means, the body being provided with a recess opening through one side of the same, an elongated member adapted to be seated within said recess, a sleeve mounted upon the body for rotation about the body or for sliding movement longitudinally of the body, a cam element carried by said member and adapted to be engaged by said sleeve whereby said member is forced tightly within said recess upon applying force to the sleeve in one direction longitudinally of its axis, a pin retractably carried by the body, spring means for normally retaining the pin in projected position with its end extending beyond the periphery of the body, and two cam surfaces formed upon the sleeve and serving to cooperate with said pin, one of said cam surfaces when engaged with said pin serving to cause longitudinal movement of the sleeve upon rotation of the sleeve in one direction, and the other cam surface serving to cause retraction of the pin upon rotating the sleeve in an opposite direction.

WALTER L. CHESTERMAN.